Patented Aug. 17, 1948

2,447,195

UNITED STATES PATENT OFFICE 2,447,195

DIAMIDES OF ALKANE DICARBOXYLIC ACIDS

Henry Martin and Hans Gysin, Basel, Hans Zaeslin, Riehen, near Basel, and Alfred Margot, Basel, Switzerland, assignors to J. R. Geigy A. G., Basel, Switzerland, a Swiss firm No Drawing. Original application October 15, 1943, Serial No. 506,418. Divided and this application March 6, 1945, Serial No. 581,345. In Switzerland December 18, 1942

4 Claims. (Cl. 260—561)

This is a divisional patent application of our copending patent application Ser. No. 506,418, filed on October 15, 1943.

It has been found that substituted alkane dicarboxylic acid amides deriving from alkane dicarboxylic acids, selected from the group consisting of ethane and propane dicarboxylic acids and from secondary aliphatic and cycloaliphatic amines respectively containing at least 3 C-atoms constitute very valuable therapeutical compounds.

As substituted alkane dicarboxylic acids according to the given definition, may be used for instance: $\alpha:\alpha$-dimethyl succinic acid, $\alpha:\alpha$-diethyl succinic acid, $\alpha:\alpha$-methyl ethyl succinic acid, tetramethyl succinic acid, $\alpha$-methyl-$\beta$-ethyl succinic acid, $\beta:\beta$-dimethyl glutaric acid, $\alpha:\alpha$-dimethyl glutaric acid, $\alpha:\alpha:\alpha'$-trimethyl glutaric acid, $\alpha:\alpha:\beta$-trimethyl glutaric acid.

The new alkane dicarboxylic acid diamides disubstituted in the amide radical are obtained by causing alkane dicarboxylic acids of the above definition or functional derivatives thereof, such as for example their halides, esters or anhydrides, to react with secondary aliphatic or cycloaliphatic amines containing at least 3 C-atoms or their salts, in the presence or absence of solvents, of condensation agents as well as of acid binding agents.

As condensation agents there are advantageously used phosphorus halides, phosphorus pentoxide, thionyl chloride, phosgene and so on.

Another method consists in that the salts of the above defined dicarboxylic acids are caused to react with carbamic acid halides derived from secondary aliphatic or cycloaliphatic amines containing at least 3 C-atoms. The missing substituents may also subsequently be introduced into amides which have been prepared by means of low substituted bases instead of with secondary amines (cf. Titherley J. Chem. Soc. London, 79, 391, 1901).

The new compounds may be used as valuable therapeutics, especially as analeptics; partly they are also suitable as solving assistants.

The present invention is illustrated, but not limited by the following examples, wherein the parts are by weight, unless otherwise stated.

Example 1

365 parts of asymmetrical dimethyl succinic acid chloride, made from $\alpha:\alpha$-dimethyl succinic acid and phosphorus pentachloride, B. P. 13 mm. 80°–85° C. are allowed to drop, while cooling, into an ethereal solution of 65 parts of diethylamine (excess of 10%). The diethylamine hydrochloride thus precipitated and the solvent are removed, while the residue is dissolved in water and precipitated by means of caustic potash lye. After a possibly repeated distillation in high-vacuo the $\alpha:\alpha$-dimethyl succinic acid bis-diethyl amide distils at a pressure of 0.35 mm. at 122°–123° C. The new compound is easily soluble in water and organic solvents.

By interaction of diethyl carbamic acid chloride with the sodium salt of the $\alpha:\alpha$-dimethyl succinic acid the above described diethyl amide is also obtained in a good yield.

Further compounds of this group are shown in the following table.

Table 1

Succinic acids R$\diagdown$ $^{COOH}_{COOH}$

| No. | R | amine | B. P. (mm.) | form | solubility in: w=water e=ether |
|---|---|---|---|---|---|
| 1 | $C_2H_5$—$\underset{C_2H_5}{\overset{}{C}}$—$CH_2$— | $HN(C_2H_5)_2$ | 150–151° C. (0.5) | liquid | w soluble, e soluble. |
| 2 | $CH_3$—$\underset{CH_3}{\overset{}{C}}$—$CH_2$— | $HN\underset{CH_2-CH_2}{\overset{CH_2-CH_2}{\diagdown}}CH_2$ | 160–162° C. (0.2) | do | w difficultly soluble, e soluble. |

EXAMPLE 2

40 parts of diethylamine are dissolved in 200 parts by volume of absolute ether and dropwise treated at 0°–10° C. with a solution of 22 parts of β:β-dimethyl glutaric acid chloride in 150 parts by volume of absolute ether. Then the mixture is stirred at room temperature for still 2 hours, whereupon the diethylamine hydrochloride is sucked off, the ether solution washed with a concentrated potassium carbonate solution, then dried with calcined sodium sulfate. The solvent is now distilled off and the residual oil distilled in high-vacuo; its boiling point at 0.2 mm. pressure is 126°–128° C.

The β:β-dimethyl glutaric acid bis-diethylamide is soluble in water.

Further compounds of this group are enumerated in the following table:

Table 2

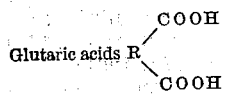

Glutaric acids R

| No. | R | amine | B. P. (mm.) | form | solubility in: $w$=water $e$=ether |
|---|---|---|---|---|---|
| 1 | CH₃ CH₂— \C/ CH₃ CH₂— | HN⟨CH₂—CH₂\CH₂/CH₂—CH₂⟩ | 187–190° C. (0.3) | liquid | $w$=difficultly soluble, $e$=soluble. |
| 2 | CH₃ CH₂— \C/ CH₃ CH₂— | HN(CH₂—CH=CH₂)₂ | 160–162° C. (0.5) | do | $w$=difficultly soluble, $e$=soluble. |
| 3 | C₂H₅ CH₂— \C/ C₂H₅ CH₂— | HN(C₂H₅)₂ | 140–143° C. (1) | do | $w$=difficultly soluble. |
| 4 | CH₃ CH₂— \C/ CH₃ CH₃—CH— | do | 135–136° C. (0.6) | solid M. P. 57° C. | $w$=moderately soluble, $e$=easily soluble. |

According to the invention the operation sequences of the reaction illustrated in the examples lead to the corresponding amides when using the following dicarboxylic acids: α:α-methyl ethyl succinic acid, tetramethyl succinic acid, α-methyl-β-ethyl succinic acid, α:α-dimethyl glutaric acid and α:α:α′-trimethyl glutaric acid.

What we claim is:

1. A member selected from the group consisting of the alkane dicarboxylic acid diamides of the formulae

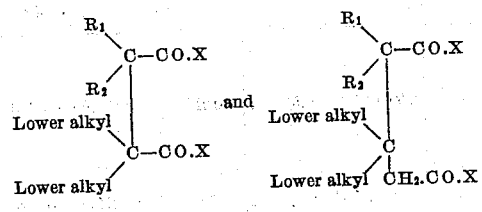

wherein X represents the radical of a secondary dialkylamine containing at least 3 carbon atoms, and $R_1$ and $R_2$ each represents a member selected from the group consisting of hydrogen and lower alkyl.

2. The bis-diethylamide of 2:2-dimethyl glutaric acid of the formula

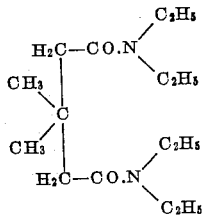

being a colorless liquid of the boiling point of 126°–128° C. at 0.2 mm. pressure.

3. The bis-diethylamide of 1:1-dimethyl succinic acid of the formula

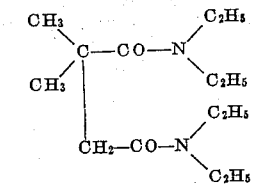

being a colorless liquid of the boiling point of 122°–123° C. at 0.35 mm. pressure.

4. The bis-diethylamide of 1:1-diethyl succinic acid of the formula

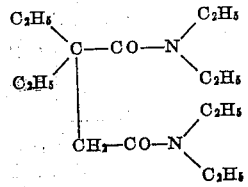

being a colorless liquid of the boiling point of 150°–151° C. at 0.5 mm. pressure.

HENRY MARTIN.
HANS GYSIN.
HANS ZAESLIN.
ALFRED MARGOT.

REFERENCES CITED

The following references are of record in the file of this patent:

UNITED STATES PATENTS

| Number | Name | Date |
|---|---|---|
| 1,986,854 | Reid | Jan. 8, 1935 |
| 2,094,608 | Kritchevsky | Oct. 5, 1937 |
| 2,130,948 | Carothers | Sept. 20, 1938 |
| 2,310,873 | Sauer | Feb. 9, 1943 |

OTHER REFERENCES

Sidgwicks, "Organic Chemistry of Nitrogen," Taylor & Baker (1937), pages 148, 149 and 150.

Morrell, "Journal Chemical Society," 105 (1914), 1733 to 1739, 2698 to 2707.

Dickens et al., "Journal Chemical Society," 125 (1924), 1830–1840.

D'Ianni, "Journal American Chemical Society," 61, 1675–1681 (1936).

Paden et al., "Journal American Chemical Society," 58, 2487–2499 (1936).

Blaise et al., "Comptes Rendus Acad. Sci.," vol. 180 (1925), page 1345.

Huan, "Comptes Rendus Acad. Sci.," vol. 188 (1929), page 1174.